(12) United States Patent
Khan et al.

(10) Patent No.: US 6,952,324 B2
(45) Date of Patent: Oct. 4, 2005

(54) HYDRODYNAMIC FLUID BEARING CONTAINING LUBRICANTS WITH REDUCED TEMPERATURE SENSITIVITY FOR DISK DRIVE APPLICATION

(75) Inventors: Raquib U. Khan, Pleasanton, CA (US); Mohammad M. Ameen, Campbell, CA (US)

(73) Assignee: Seagate Technology, LLC, Scotts Valley, CA (US)

( * ) Notice: Subject to any disclaimer, the term of this patent is extended or adjusted under 35 U.S.C. 154(b) by 491 days.

(21) Appl. No.: 10/191,658

(22) Filed: Jul. 9, 2002

(65) Prior Publication Data

US 2003/0076624 A1 Apr. 24, 2003

Related U.S. Application Data

(60) Provisional application No. 60/343,779, filed on Oct. 18, 2001.

(51) Int. Cl.[7] ........................ G11B 17/02; H02K 5/16; H02K 7/08
(52) U.S. Cl. .................. 360/99.08; 310/90; 310/67 R
(58) Field of Search .................. 360/99.08, 98.07, 360/97.02; 310/90, 156.01, 67 R; 384/107, 133

(56) References Cited

U.S. PATENT DOCUMENTS

| | | | | |
|---|---|---|---|---|
| 5,366,647 A | * | 11/1994 | Gutierrez et al. ........... 508/468 |
| 5,518,319 A | | 5/1996 | Selby .................. 384/100 |
| 5,559,651 A | | 9/1996 | Grantz et al. ........... 360/99.08 |
| 5,627,147 A | * | 5/1997 | Hayakawa et al. ........ 508/501 |
| 5,789,836 A | * | 8/1998 | Hayakawa .................. 310/90 |
| 5,821,313 A | * | 10/1998 | Sivik et al. ............. 526/265 |
| 5,858,931 A | * | 1/1999 | Tanaka et al. ........... 508/364 |
| 5,907,456 A | | 5/1999 | Khan et al. ............ 360/99.08 |
| 5,930,075 A | | 7/1999 | Khan et al. |
| 5,940,246 A | | 8/1999 | Khan et al. ............ 360/99.08 |
| 6,678,115 B2 | * | 1/2004 | Khan .................. 360/99.08 |
| 2003/0050197 A1 | * | 3/2003 | Akao .................... 508/280 |

FOREIGN PATENT DOCUMENTS

| | | | | | |
|---|---|---|---|---|---|
| JP | 54161643 A | * | 12/1979 | ........... C09D/5/00 |
| JP | 08266007 A | * | 10/1996 | ........... H02K/7/08 |
| JP | 09125086 A | * | 5/1997 | ........ C10M/169/04 |
| JP | 09177766 A | * | 7/1997 | ........... F16C/17/02 |
| JP | 2001279284 A | * | 10/2001 | ........ C10M/109/00 |
| WO | PCT/US02/37108 | | 11/2002 | |

* cited by examiner

*Primary Examiner*—William J. Klimowicz
(74) *Attorney, Agent, or Firm*—Morrison & Foerster LLP

(57) ABSTRACT

A disc drive storage system including a housing having a central axis, a stationary member that is fixed with respect to the housing and coaxial with the central axis, and a rotatable member that is rotatable about the central axis with respect to the stationary member. A hydro bearing interconnects the stationary member and the rotatable member and includes a lubricating fluid having a base fluid and an additive and/or a combination of additives or base fluids for reducing the temperature dependency of the viscosity of the lubricating fluid.

17 Claims, 5 Drawing Sheets

HYDRODYNAMIC FLUID BEARING CONTAINING LUBRICANTS WITH REDUCED TEMPERATURE SENSITIVITY FOR DISK DRIVE APPLICATION

CROSS-REFERENCE TO RELATED APPLICATIONS

This application claims benefit of U.S. provisional patent application Ser. No. 60/343,779 filed Oct. 18, 2001, which is herein incorporated by reference.

BACKGROUND OF THE INVENTION

1. Field of the Invention

The present invention relates to the field of hydrodynamic bearing spindle motors for disc drive data storage devices and, more particularly, to a motor having a lubricant with an additive and/or a combination of additives or lubricants for reducing the temperature dependency of the lubricant's viscosity.

2. Description of the Related Art

Disc drive data storage devices, known as "Winchester" type disc drives, are well-known in the industry. In a Winchester disc drive, digital data is written to and read from a thin layer of magnetizable material on the surface of rotating discs. Write and read operations are performed through a transducer that is carried in a slider body. The slider and transducer are sometimes collectively referred to as a head, and typically a single head is associated with each disc surface. The heads are selectively moved under the control of electronic circuitry to any one of a plurality of circular, concentric data tracks on the disc surface by an actuator device. Each slider body includes a self-acting air bearing surface. As the disc rotates, the disc drags air beneath the air bearing surface, which develops a lifting force that causes the slider to lift and fly several microinches above the disc surface.

In the current generation of disc drive products, the most commonly used type of actuator is a rotary moving coil actuator. The discs themselves are typically mounted in a "stack" on the hub structure of a brushless DC spindle motor. The rotational speed of the spindle motor is precisely controlled by motor drive circuitry, which controls both the timing and the power of commutation signals directed to the stator windings of the motor. Typical spindle motor speeds have been in the range of 3600 RPM. Current technology has increased spindle motor speeds to 7200 RPM, 10,000 RPM and above.

One of the principal sources of noise in disc drive data storage devices is the spindle motor. Disc drive manufacturers have recently begun looking at replacing conventional ball or roller bearings in spindle motors with "hydro" bearings, such as hydrodynamic or hydrostatic bearings. A hydro bearing relies on a fluid film which separates the bearing surfaces and is therefore much quieter and in general has lower vibrations than conventional ball bearings. A hydrodynamic bearing is a self-pumping bearing that generates a pressure internally to maintain the fluid film separation. A hydrostatic bearing requires an external pressurized fluid source to maintain the fluid separation. Relative motion between the bearing surfaces in a hydro bearing causes a shear element that occurs entirely within the fluid film such that no contact between the bearing surfaces occurs.

In a hydro bearing, a lubricating fluid provides a bearing surface between a stationary member of the housing and a rotating member of the disc hub. Typical lubricants include oil or ferromagnetic fluids. Hydro bearings spread the bearing surface over a larger surface area in comparison with a ball bearing assembly, which comprises a series of point interfaces. This is desirable because the increased bearing surface decreases wobble or run-out between the rotating and fixed members.

Viscosity and anti-wear performance are important considerations in miniature hydro bearings for disc drives. The lubrication properties that must be controlled, and the degree of control that must be obtained, are unique to these bearings. Viscosity determines power dissipation and bearing stiffness, which should be relatively constant over various operating conditions. In general, viscosity of the lubricant decreases with an increase in temperature. In high-speed, high-temperature applications, reduced viscosity of the lubricant can result in an unexpected touch down of the mating surfaces of the hydro bearings because of the loss of stiffness and may cause premature failure of the disc drive.

Therefore, there exists a need in the art for a hydrodynamic fluid bearing having lubricants exhibiting reduced viscosity temperature dependency in disc drive applications.

SUMMARY OF THE INVENTION

The disc drive data storage system of the present invention includes a housing having a central axis, a stationary member that is fixed with respect to the housing and coaxial with the central axis, and a rotatable member that is rotatable about the central axis with respect to the stationary member. A stator is fixed with respect to the housing. A rotor is supported by the rotatable member and is magnetically coupled to the stator. At least one data storage disc is attached to and is coaxial with the rotatable member. A hydro bearing interconnects the stationary member and the rotatable member and includes a lubricating fluid comprising a base fluid and an additive and/or a combination of additives or base fluids for reducing the temperature dependency of the lubricating fluid's viscosity.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
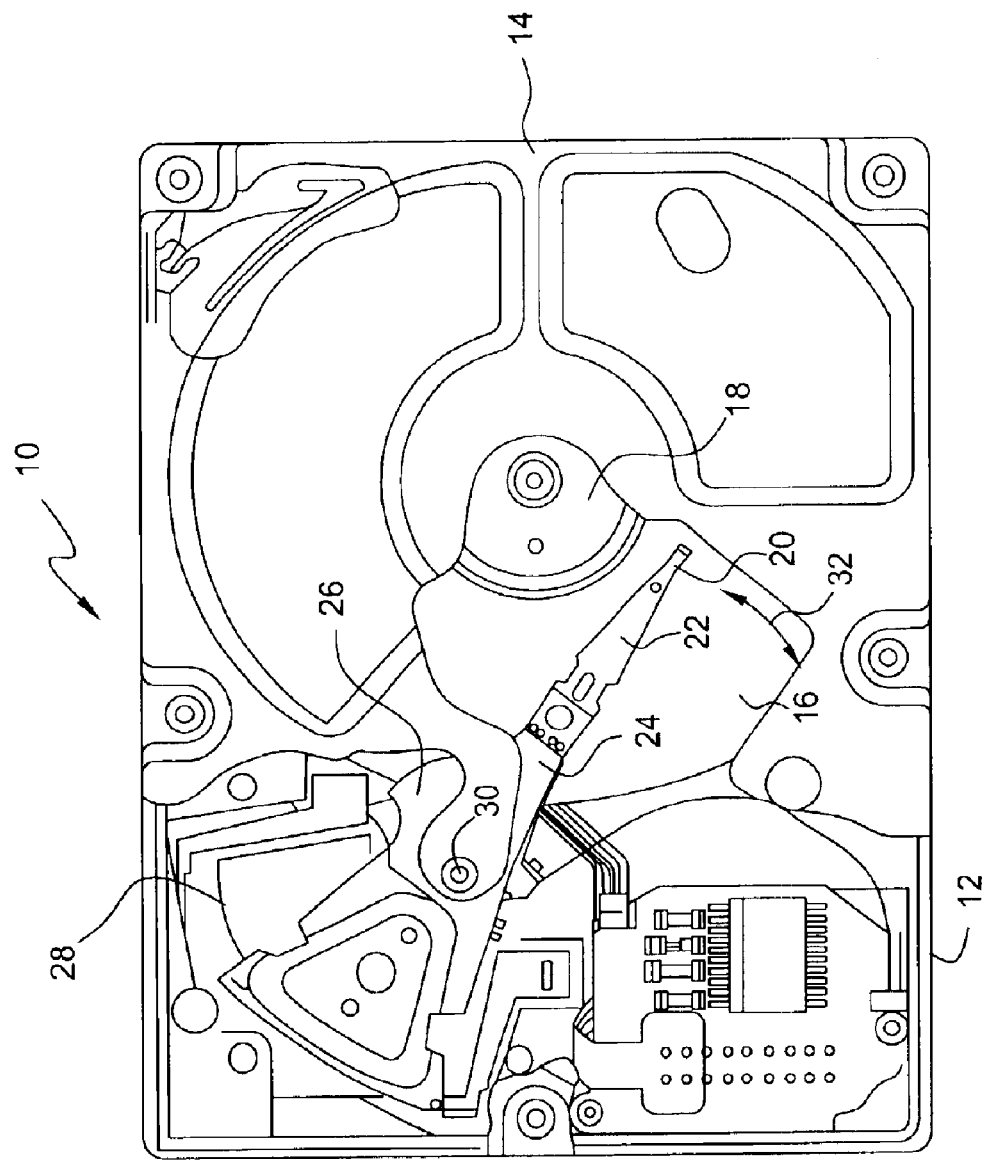
FIG. 1 is a top plan view of a disc drive data storage device in accordance with the present invention.

The present invention is a disc drive data storage device having a hydrodynamic or hydrostatic bearing spindle motor with a lubricating fluid composition that exhibits reduced temperature sensitivity for the unique requirements of a disc drive. FIG. 1 is a top plan view of a typical disc drive 10 in which the present invention is useful. Disc drive 10 includes a housing base 12 that is combined with top cover 14 to form a sealed environment to protect the internal components from contamination by elements from outside the sealed environment.

Disc drive 10 further includes a disc pack 16, which is mounted for rotation on a spindle motor (not shown) by a disc clamp 18. Disc pack 16 includes a plurality of individual discs, which are mounted for co-rotation about a central axis. Each disc surface has an associated head 20, which is mounted to disc drive 10 for communicating with the disc surface. In the example shown in FIG. 1, heads 20 are supported by flexures 22, which are in turn attached to head mounting arms 24 of an actuator body 26. The actuator shown in FIG. 1 is of the type known as a rotary moving coil actuator and includes a voice coil motor (VCM), shown generally at 28. Voice coil motor 28 rotates actuator body 26 with its attached heads 20 about a pivot shaft 30 to position heads 20 over a desired data track along an arcuate path 31. While a rotary actuator is shown in FIG. 1, the present invention is also useful in disc drives having other types of actuators, such as linear actuators.

Figure 2:
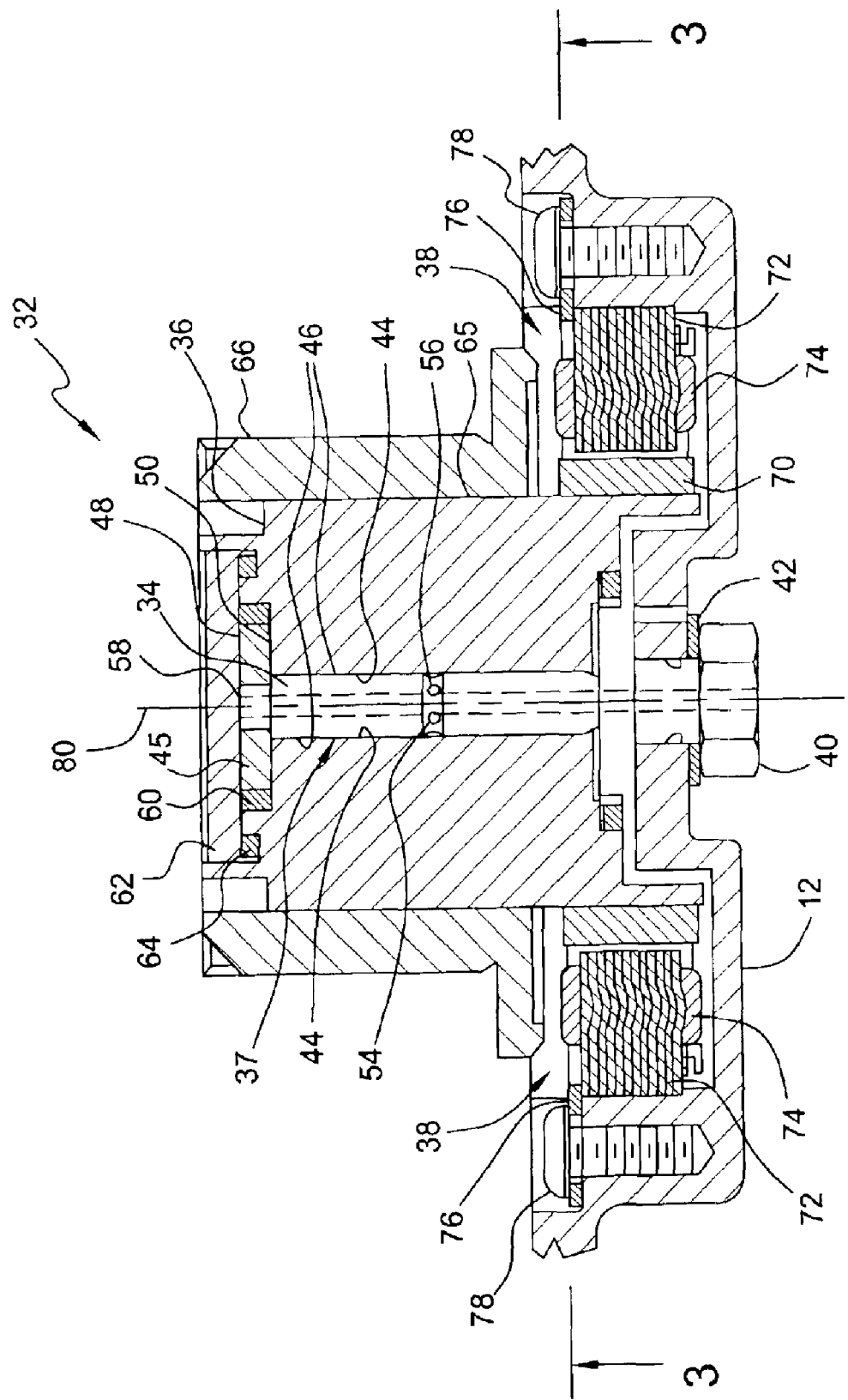
FIG. 2 is a sectional view of a hydrodynamic bearing spindle motor in accordance with the present invention.

FIG. 2 is a sectional view of a hydrodynamic bearing spindle motor 32 in accordance with the present invention. Spindle motor 32 includes a stationary member 34, a hub 36 and a stator 38. In the embodiment shown in FIG. 2, the stationary member is a shaft that is fixed and attached to base 12 through a nut 40 and a washer 42. Hub 36 is interconnected with shaft 34 through a hydrodynamic bearing 37 for rotation about shaft 34. Bearing 37 includes radial working surfaces 44 and 46 and axial working surfaces 48 and 50. Shaft 34 includes fluid ports 54, 56 and 58 that supply lubricating fluid 60 and assist in circulating the fluid along the working surfaces of the bearing. Lubricating fluid 60 is supplied to shaft 34 by a fluid source (not shown) that is coupled to the interior of shaft 34 in a known manner.

Spindle motor 32 further includes a thrust bearing 45, which forms the axial working surfaces 48 and 50 of hydrodynamic bearing 37. A counterplate 62 bears against working surface 48 to provide axial stability for the hydrodynamic bearing and to position hub 36 within spindle motor 32. An O-ring 64 is provided between counterplate 62 and hub 36 to seal the hydrodynamic bearing. The seal prevents hydrodynamic fluid 60 from escaping between counterplate 62 and hub 36.

Hub 36 includes a central core 65 and a disc carrier member 66, which supports disc pack 16 (shown in FIG. 1) for rotation about shaft 34. Disc pack 16 is held on disc carrier member 66 by disc clamp 18 (also shown in FIG. 1). A permanent magnet 70 is attached to the outer diameter of hub 36, which acts as a rotor for spindle motor 32. Core 65 is formed of a magnetic material and acts as a back-iron for magnet 70. Rotor magnet 70 can be formed as a unitary, annular ring or can be formed of a plurality of individual magnets that are spaced about the periphery of hub 36. Rotor magnet 70 is magnetized to form one or more magnetic poles.

Stator 38 is attached to base 12 and includes stator laminations 72 and stator windings 74. Stator windings 74 are attached to laminations 72. Stator windings 74 are spaced radially from rotor magnet 70 to allow rotor magnet 70 and hub 36 to rotate about a central axis 80. Stator 38 is attached to base 12 through a known method such as one or more C-clamps 76 which are secured to the base through bolts 78.

Commutation pulses applied to stator windings 74 generate a rotating magnetic field that communicates with rotor magnet 70 and causes hub 36 to rotate about central axis 80 on bearing 37. The commutation pulses are timed, polarization-selected DC current pulses that are directed to sequentially selected stator windings to drive the rotor magnet and control its speed.

In the embodiment shown in FIG. 2, spindle motor 32 is a "below-hub" type motor in which stator 38 has an axial position that is below hub 36. Stator 38 also has a radial position that is external to hub 36, such that stator windings 74 are secured to an inner diameter surface 82 (FIG. 3) of laminations 72. In an alternative embodiment, the stator is positioned within the hub, as opposed to below the hub. The stator can have a radial position that is either internal to the hub or external to the hub. In addition, the spindle motor can have a fixed shaft, as shown in FIG. 2, or a rotating shaft. In a rotating shaft spindle motor, the bearing is located between the rotating shaft and an outer stationary sleeve that is coaxial with the rotating shaft.

Figure 3:
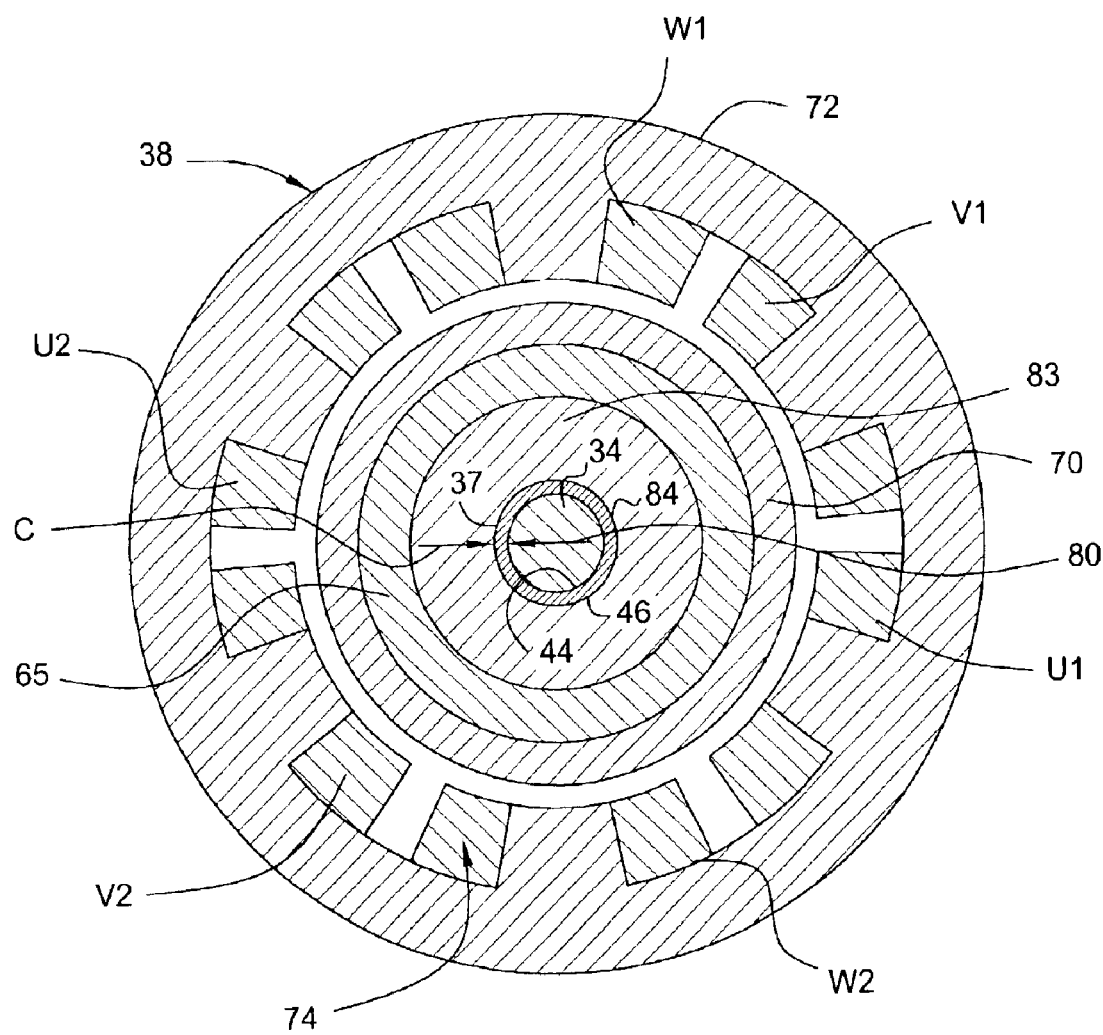
FIG. 3 is a diagrammatic sectional view of the hydrodynamic spindle motor taken along the line 3—3 of FIG. 2, with portions removed for clarity.

FIG. 3 is a diagrammatic sectional view of hydrodynamic spindle motor 32 taken along line 3—3 of FIG. 2, with portions removed for clarity. Stator 38 includes laminations 72 and stator windings 74, which are coaxial with rotor magnet 70 and central core 65. Stator windings 74 include phase windings W1, V1, U1, W2, V2 and U2 that are wound around teeth in laminations 72. The phase windings are formed of coils that have a coil axis that is normal to and intersects central axis 80. For example, phase winding W1 has a coil axis 83 that is normal to central axis 80. Radial working surfaces 44 and 46 of hydrodynamic bearing 37 are formed by the outer diameter surface of shaft 34 and the inner diameter surface of central core 65. Radial working surfaces 44 and 46 are separated by a lubrication fluid, which maintains a clearance c during normal operation.

The lubrication fluid 60 viscosity determines the power dissipation and bearing stiffness, which should be relatively constant, over various operating conditions. In general, the viscosity of the lubricant decreases with an increase in temperature. Premature failure in hydrodynamic fluid bearings can occur because of the loss of stiffness when the lubricant viscosity decreases at a very fast rate with an increase in the temperature.

In accordance with the present invention, the lubrication fluid 60 comprises a base fluid and an additive and/or a combination of additives or base fluids for reducing the temperature dependency of the lubricant viscosity as the temperature thereof increases. Preferred base fluids include perfluoropolyethers, synthetic esters, synthetic hydrocarbons, and highly refined mineral hydrocarbons. Most preferred base fluids include diesters, polyol esters, and polyalphaolefins (PAO's). These base fluids can also be blended in a variety of combinations. The base fluids typically have a viscosity within a range of about 5 cP to about 30 cP at 30° C.

The additive may comprise a polymer that reduces the rate of the viscosity drop for the lubrication fluid 60 as the temperature is increased. The additive functions to modulate the rate of viscosity decrease so that the viscosity drop is reduced making the lubrication fluid flatter, preferably at higher operating temperatures (e.g., temperatures greater than about 40° C.). In addition, the additive is selected such that it does not sacrifice desirable lubricating properties, such as anti-oxidation, anti-corrosion, and anti-wear performance. Specifically, given an otherwise suitable base fluid having an inadequate temperature-viscosity behavior, a high molecular weight soluble polymer may be added to the base fluid at a concentration of 1–50% by volume of the lubrication fluid 60. The molecular weight of the polymer additive is preferably between about 1,000 and 1,000,000 Daltons. Preferred additives include organic polymers, such as polymethylacrylates, polyisobutene, olefin copolymer, styrene copolymer, short chain alcohol esters, or like type organic polymers.

EXAMPLES

Figure 4:
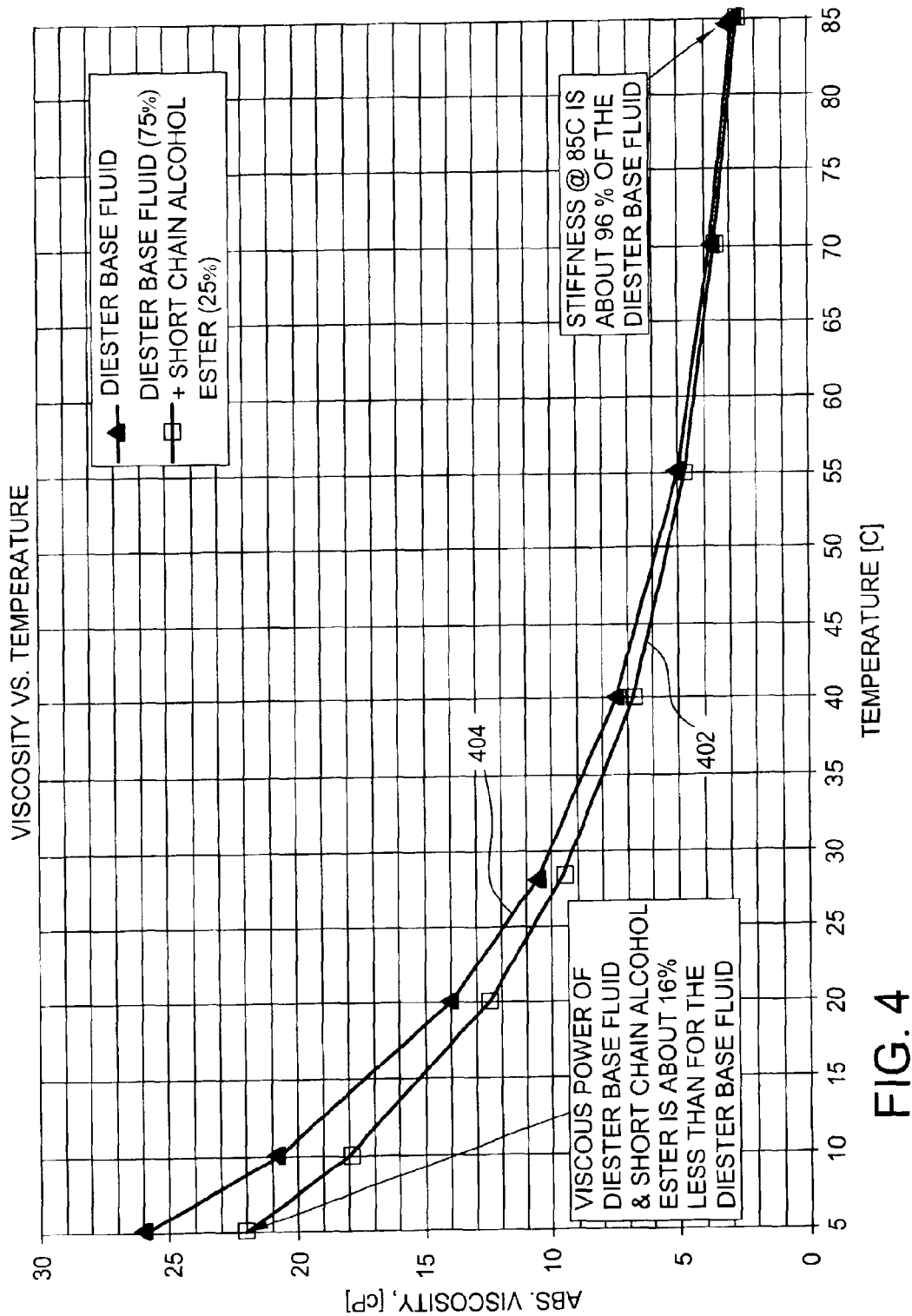
FIG. 4 is a graph of viscosity versus temperature for the hydro bearing lubricant of the present invention as compared to a conventional lubricant.

FIG. 4 shows a graph of viscosity versus temperature for lubrication fluid 60 including an additive in accordance with the present invention. Specifically, temperature-viscosity curve 402 shows the temperature dependency of the viscosity for a lubrication fluid 60 having a diester base fluid with a short chain alcohol ester additive at a concentration of about 25%. Temperature-viscosity curve 404 shows the temperature dependency of viscosity for a lubrication fluid 60 comprising only a diester base fluid. Curve 404 comprising only the diester base fluid has a rate of viscosity decrease of about 0.8 cP/° C. at temperatures less than 20° C. In contrast, curve 402 comprising the diester base fluid with the short chain alcohol ester additive has a rate of viscosity decrease of about 0.64 cP/° C. at temperatures less than 20° C., which is a 28% improvement over the lubricant comprising only the diester base fluid.

Additionally, in hydrodynamic bearings, the power requirement at low temperatures is critical, with the goal being to reduce power usage at low temperatures (e.g., temperatures less than about 30° C.) without sacrificing the stiffness at high temperatures (e.g., temperatures greater than about 40° C.). Thus, referring to FIG. 4, the power requirement at low temperatures for the lubricant of curve 402 will be about 16% less at low temperatures than for the lubricant of curve 404. Additionally, the stiffness at about 85° C. of the lubricant of curve 402, comprising a diester base fluid with the short chain alcohol ester, is about 96% of the stiffness of the lubricant of curve 404 comprising only the diester base fluid.

Figure 5:
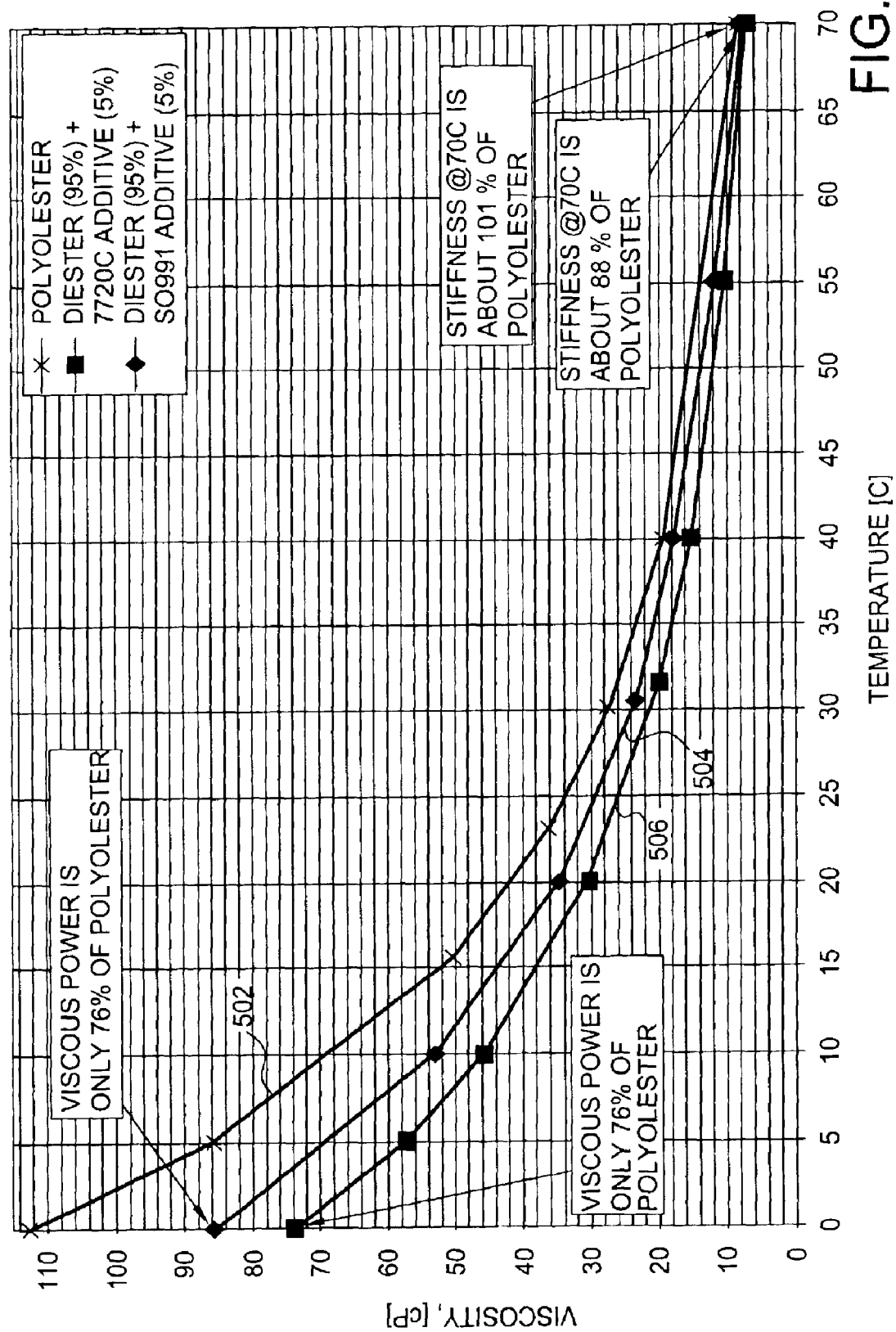
FIG. 5 is a graph of viscosity versus temperature for another hydro bearing lubricant of the present invention as compared to a conventional lubricant.

FIG. 5 shows a graph of viscosity versus temperature for several lubrication fluids in accordance with the present invention. If the hydrodynamic bearing design requires a higher stiffness at higher operating temperatures (e.g., temperatures greater than about 70° C.) higher viscosity lubricating fluids are typically used, requiring higher powers at low temperatures. For example, temperature-viscosity curve 502 shows the temperature dependency of the viscosity for a high stiffness polyol ester lubrication fluid. Temperature-viscosity curve 504 shows the temperature dependency of the viscosity for a diester base fluid with an additive, SO991 (commercially available from Kluber Lubrication Co.), at a concentration of about 5%. Temperature-viscosity curve 506 shows the temperature dependency of viscosity for a diester base fluid with a polymethacrylate additive 7720C (commercially available from Lubrizol Corp.) at a concentration of about 5%.

The power requirement at low temperatures for the lubricant of curve 504 will be about 24% less at low temperatures than for the lubricant of curve 502. The power requirement at low temperatures for the lubricant of curve 506 will be about 35% less at low temperatures than for the lubricant of curve 502.

Furthermore, the stiffness at about 70° C. of the lubricant of curve 506, comprising a diester base fluid with the polymethylmethacrylate additive 7720C, is about 88% of the stiffness of the lubricant of curve 502 comprising only the polyol ester lubrication fluid. The stiffness at about 70° C. of the lubricant of curve 504, comprising a diester base fluid with the SO991 additive, is about 101% of the stiffness of the polyol ester lubrication fluid of curve 502.

While foregoing is directed to the preferred embodiment of the present invention, other and further embodiments of the invention may be devised without departing from the basic scope thereof, and the scope thereof is determined by the claims that follow.

What is claimed is:

1. A disc drive storage system comprising:
   a housing having a central axis;
   a stationary member that is fixed with respect to the housing and coaxial with the central axis;
   a stator fixed with respect to the housing;
   a rotatable member that is rotatable about the central axis with respect to the stationary member;
   a rotor supported by the rotatable member and magnetically coupled to the stator;
   at least one data storage disc attached to and coaxial with the rotatable member;
   an actuator supporting a head proximate to the data storage disc for communicating with the disc; and
   a hydro bearing interconnecting the stationary member and the rotatable member and having working surfaces separated by a lubricating fluid comprising one or more base fluids and at least one additive, wherein the at least one additive reduces the rate of viscosity decrease of the base fluid as a function of increasing temperature, and wherein a percent power reduction for the lubricating fluid at temperatures below about 10° C. is higher than a percent stiffness reduction at temperatures above about 70° C.

2. The disc drive storage system of claim 1 wherein the base fluid is a lubricant selected from the group consisting of perfluoropolyethers, synthetic esters, synthetic hydrocarbons and highly refined mineral hydrocarbons.

3. The disc drive storage system of claim 1 wherein the at least one additive is a polymer selected from the group consisting of polymethylacrylates, polyisobutene, olefin copolymer and styrene copolymer.

4. The disc drive storage system of claim 1 wherein the at least one additive is a short chain alcohol ester.

5. The disc drive storage system of claim 1 wherein the at least one additive has a concentration of about 1–50% by volume of the lubricating fluid.

6. The disc drive storage system of claim 3 wherein the at least one additive has a molecular weight within a range of about 1,000 Daltons to about 1,000,000 Daltons.

7. A hydro bearing interconnecting a stationary member and a rotatable member and including working surfaces on each of the stationary member and the rotatable member separated over at least a part of their surface area by a lubricating fluid comprising one or more base fluids and at least one additive, wherein the at least one additive reduces the rate of viscosity decrease of the base fluid as a function of increasing temperature, and wherein a percent power reduction for the lubricating fluid at temperatures below about 10° C. is higher than a percent stiffness reduction at temperatures above about 70° C.

8. The hydro bearing of claim 7 wherein the base fluid is a lubricant selected from the group consisting of perfluoropolyethers, synthetic esters, synthetic hydrocarbons and highly refined mineral hydrocarbons.

9. The hydro bearing of claim 7 wherein the at least one additive is a polymer selected from the group consisting of polymethylacrylates, polyisobutene, olefin copolymer and styrene copolymer.

10. The hydro bearing of claim 9 wherein the at least one additive has a molecular weight within a range of about 1,000 Daltons to about 1,000,000 Daltons.

11. The hydro bearing of claim 7 wherein the at least one additive is a short chain alcohol ester.

12. The hydro bearing of claim 7 wherein the at least one additive has a concentration of about 1–50% by volume of the lubricating fluid.

13. A motor comprising: a housing having a central axis;
a stationary member that is fixed with respect to the housing and coaxial with the central axis;
a stator fixed with respect to the housing;
a rotatable member that is rotatable about the central axis with respect to the stationary member;
a rotor supported by the rotatable member and magnetically coupled to the stator; and
a hydro bearing interconnecting the stationary member and the rotatable member and having working surfaces separated by a lubricating means comprising one or more base fluids and at least one additive, wherein the at least one additive reduces the rate of viscosity decrease of the base fluid as a function of increasing temperature, and wherein a percent power reduction for the lubricating means at temperatures below about 10° C. is higher than a percent stiffness reduction at temperatures above about 70° C.

14. The motor of claim 13 wherein the base fluid is a lubricant selected from the group consisting of perfluoropolyethers, synthetic esters, synthetic hydrocarbons and highly refined mineral hydrocarbons.

15. The motor of claim 13 wherein the at least one additive is a polymer selected from the group consisting of polymethylacrylates, polyisobutene, olefin copolymer and styrene copolymer.

16. The motor of claim 13 wherein the at least one additive is a short chain alcohol ester.

17. The motor of claim 13 wherein the at least one additive has a concentration of about 1–50% by volume of the lubricating fluid.

* * * * *